US010069362B2

(12) United States Patent
Kawasaki et al.

(10) Patent No.: US 10,069,362 B2
(45) Date of Patent: Sep. 4, 2018

(54) STRUCTURE FOR PREVENTING SCATTERING OF MAGNET AND RETAINING MAGNET FOR ROTATING ELECTRICAL MACHINE

(71) Applicant: Hitachi Automotive Systems, Ltd., Hitachinaka-shi, Ibaraki (JP)

(72) Inventors: Shozo Kawasaki, Hitachinaka (JP); Hiroshi Kanazawa, Hitachinaka (JP); Koichi Kashiwa, Hitachinaka (JP); Kenji Nakayama, Hitachinaka (JP); Yasunaga Hamada, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 282 days.

(21) Appl. No.: 14/889,700

(22) PCT Filed: Mar. 10, 2014

(86) PCT No.: PCT/JP2014/056091
§ 371 (c)(1),
(2) Date: Jan. 13, 2016

(87) PCT Pub. No.: WO2014/181576
PCT Pub. Date: Nov. 13, 2014

(65) Prior Publication Data
US 2016/0126793 A1 May 5, 2016

(30) Foreign Application Priority Data

May 7, 2013 (JP) .................................. 2013-097270

(51) Int. Cl.
*H02K 1/30* (2006.01)
*H02K 5/128* (2006.01)
(Continued)

(52) U.S. Cl.
CPC ................ *H02K 1/30* (2013.01); *H02K 1/278* (2013.01); *H02K 1/2733* (2013.01); *H02K 1/28* (2013.01); *H02K 1/32* (2013.01); *H02K 5/128* (2013.01)

(58) Field of Classification Search
CPC H02K 1/30; H02K 1/278; H02K 1/32; H02K 1/2733; H02K 1/28; H02K 1/185; H02K 5/128
(Continued)

(56) References Cited

U.S. PATENT DOCUMENTS 9,425,658 B2* 8/2016 Tomizawa ............. H02K 1/278
2009/0102304 A1* 4/2009 Yamamura ............. H02K 1/278
310/156.28

(Continued)

FOREIGN PATENT DOCUMENTS

JP 4-150748 A 5/1992
JP 2006-87276 A 3/2006
(Continued)

OTHER PUBLICATIONS

International Search Report (PCT/ISA/210) issued in counterpart PCT Application No. PCT/JP2014/056091 dated May 13, 2014 with English-language translation (four (4) pages).

*Primary Examiner* — Bernard Rojas
*Assistant Examiner* — Rashad Johnson
(74) *Attorney, Agent, or Firm* — Crowell & Moring LLP

(57) ABSTRACT

In a rotating electrical machine, in the case where a cylindrical component is fixed by press fitting or the like, the opening edge of the cylindrical component is widened toward the end to provide peeps for facilitating the insertion of the cylindrical component. However, the outer shape of a rotor expands due to the peeps, and a gap needs to be provided between the rotor and a stator in consideration of
(Continued)

the expanded portion of the outer shape, which causes the degradation of the performance of the rotating electrical machine. In addition, in the case where magnets are fixed only by the tightening force of a magnet cover, the greater the centrifugal force becomes, the larger the clamping margin becomes and similarly the larger the peeps become, and thus the expanded portion also becomes larger. However, if the opening edge is not widened to the end, the absence of the peeps makes it difficult to insert the magnet cover. The purpose of the present invention is to solve such a problem and to allow the magnets to be fixed with the magnet cover without degrading the performance of the rotating electrical machine. Cutout portions are provided at the opening edge of the magnet cover, and the cutout portions at the opening edge of the magnet cover are bent toward the internal diameter after being press fitted in order to fix the magnets.

6 Claims, 8 Drawing Sheets

(51) Int. Cl.
*H02K 1/27* (2006.01)
*H02K 1/28* (2006.01)
*H02K 1/32* (2006.01)

(58) Field of Classification Search
USPC .................................. 310/156.08, 86, 400
See application file for complete search history.

(56) References Cited

U.S. PATENT DOCUMENTS

| 2009/0108694 A1* | 4/2009 | Hanai | H02K 1/278 |
| | | | 310/156.16 |
| 2010/0127590 A1 | 5/2010 | Metral et al. | |
| 2011/0210634 A1 | 9/2011 | Dupeux et al. | |

FOREIGN PATENT DOCUMENTS

| JP | 2009-284706 A | 12/2009 |
| JP | 2010-206939 A | 9/2010 |

\* cited by examiner

CUTOUT PORTION B
25D

25A
BENT PORTION

CUTOUT PORTION C
25E

25A
BENT PORTION

STRUCTURE FOR PREVENTING SCATTERING OF MAGNET AND RETAINING MAGNET FOR ROTATING ELECTRICAL MACHINE

TECHNICAL FIELD

The present invention relates to the structure of a rotor of a brushless motor.

BACKGROUND ART

As is described in Patent Literature 1, in a rotating electric machine used in an electric power steering apparatus or the like, magnets are provided on the outer periphery of the rotary axis of the rotating electric machine, and by covering the outer surfaces of the magnets with a magnet cover, the magnets are prevented from being damaged, and at the same time even if one of the magnets is damaged, the fragments of the magnet are prevented from being scattered to the surroundings of the magnet, therefore the rotating electric machine can continue running without being locked.

Furthermore, the opening edge of the magnet cover is integrally formed with a crimped portion, the crimped portion is formed in such a way that it is widened outward in the direction of the axis, and after the magnet cover is mounted to the rotor core of the rotating electric machine, crimping is performed so as for the magnet cover to embrace the rotor core, therefore the outer surfaces of the magnets are completely covered by the magnet cover.

CITATION LIST

Patent Literature

PTL1: Japanese d Patent Application Laid-Open No. 2009-284706

SUMMARY OF INVENTION

Technical Problem

Conventionally, in a rotating electrical machine, in the case where a cylindrical component is fixed by press fitting or the like, the opening edge of the cylindrical component is widened toward the end to provide peeps for facilitating the insertion of the cylindrical component. However, the outer shape of a rotor expands due to the peeps, and a gap needs to be provided between the rotor and a stator in consideration of the expanded portion of the outer shape, which causes the degradation of the performance of the rotating electrical machine. In addition, in the case where magnets are fixed only by a tightening force of a magnet cover, the greater the centrifugal force becomes, the larger the clamping margin becomes, and similarly the larger the peeps become, and thus the expanded portion also becomes larger.

The purpose of the present invention is to address such a problem and to allow magnets to be fixed with a magnet cover.

Solution to Problem

The feature of the present invention lies in a configuration in which cutout portions are provided on the opening edge of a magnet cover, and the corner portions of the magnet cover formed by the cutout portions are bent toward the internal diameter of the magnet cover at an oblique angle to the rotary axis.

Advantageous Effects of Invention

According to the present invention, the function of preventing the dropout of the magnet cover is provided by bending the cutout portions of the opening edge of the magnet cover toward the internal diameter, and the function of preventing the dropout of the magnet cover can be provided independently of the binding force of the magnet, therefore the reduction of the binding force can be achieved.

DESCRIPTION OF EMBODIMENTS

Hereinafter, although the embodiments of the present invention will be described in detail with reference to the accompanying drawings, the present invention is not limited to the following embodiments, and various modifications and applications that fall within the technological concept of the present invention will be also included in the scope of the present invention.

Figure 1:
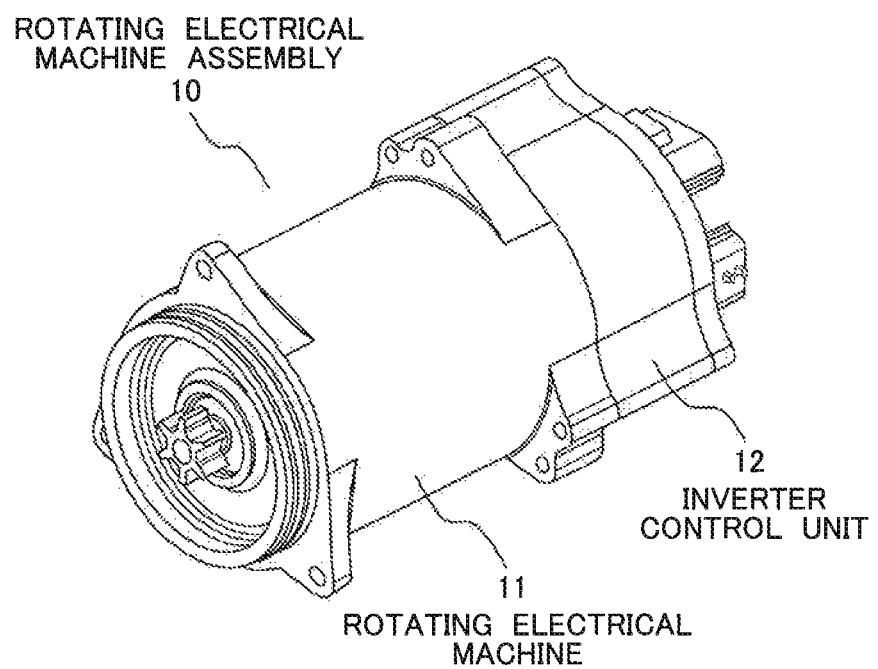
FIG. 1 is an external view of a rotating electrical machine according to an embodiment of the present invention.

FIG. 1 is a diagram showing a rotating electric machine assembly 10 used in an electric power steering apparatus as an example, and the rotating electrical machine assembly 10 includes a rotating electrical machine 11 and an inverter control unit 12 that drives and controls this rotating electrical machine.

The inverter control section 12 includes power semiconductor devices which includes an inverter circuit, a driving circuit for driving these power semiconductor devices, a control circuit for controlling this driving circuit, and the like within its housing.

The rotating electrical machine 11 and the inverter control unit 12 are firmly fixed to the rotating electrical machine assembly 10 by dedicated fixing bolts, and the rotating electrical machine assembly 10 to which both are fixed is integrated into a power steering device (not shown) with through bolts or the likes.

Next, the detailed structure of the rotating electrical machine 11 obtained by removing the inverter control unit 12 from the rotating electrical machine assembly 10 will be described with reference to FIG. 2.

Figure 2:
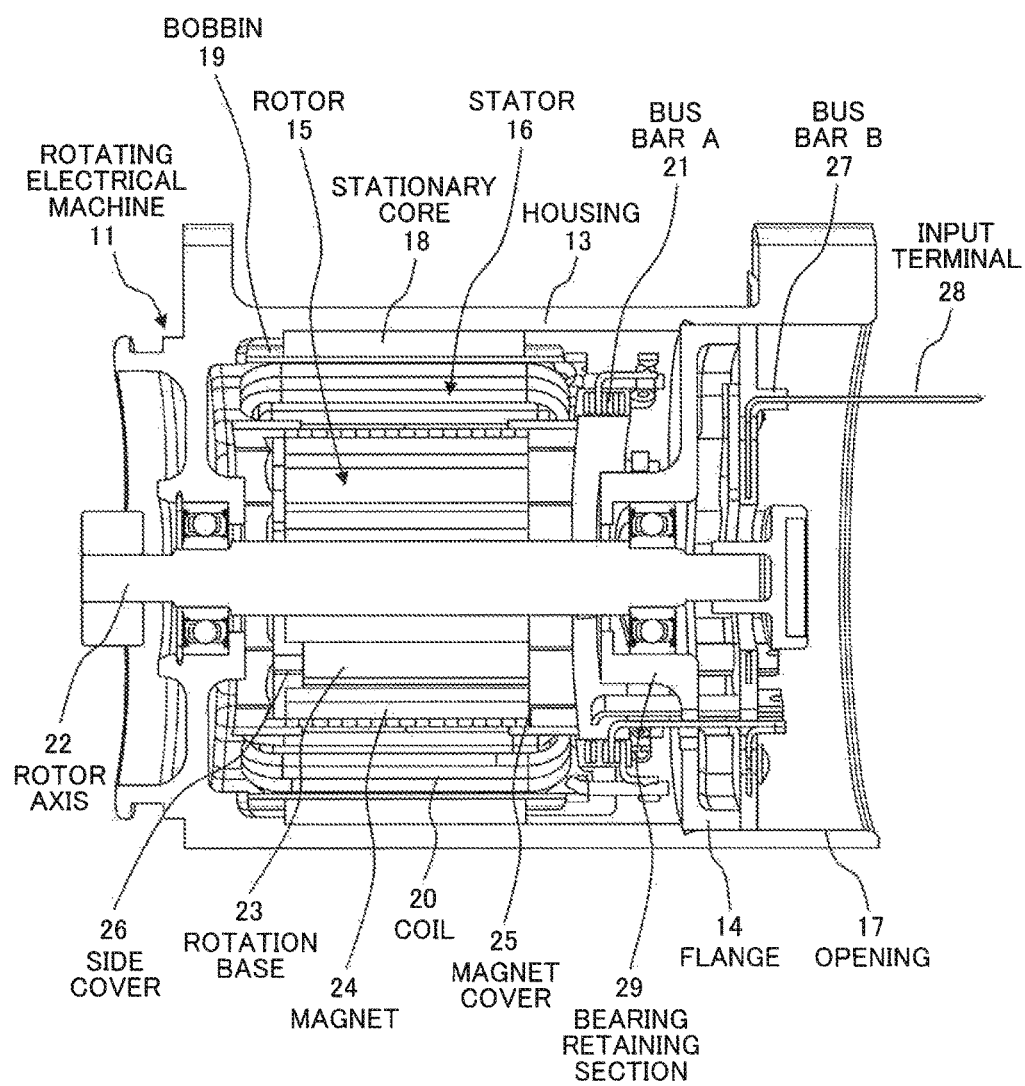
FIG. 2 is a cross-sectional view of the rotating electrical machine according to the embodiment of the present invention.

FIG. 2 is a cross-sectional view of the rotating electrical machine 11 in the direction of the axis. The rotating electrical machine 11 is roughly divided into a housing 13 and a flange 14 which include a housing unit, and a rotor 15 and a stator 16 which include a motor unit.

The housing 13 is formed in the shape of a bottomed cylinder (a cup) having an opening 17 at its one end, and a flange 14 is fixed to the housing 13 in such a way that the flange 14 closes up this opening 17.

The stator 16 is fixed on the side of the inner periphery of the housing 13. Split stationary cores 18 including the stator 16 are fixed by press fitting or shrinkage fitting while the split stationary cores 18 are retained in a circular shape as a whole. The split surfaces of these split stationary cores 18 are formed in a circular shape with welding or without welding as a whole.

A bobbin 19 is attached to a stationary core 18, and a coil 20 is wound on the outer peripheral portion of the bobbin 19. Lead wires of the coil 20 are connected to bus bars 21. Furthermore, the coil 20 is configured in such a way that the lead wires of the coil are pulled out after the coil 20 is two-consecutively or four-consecutively wound or after the coil 20 is wound around the stationary core 18, and the lead wires are connected to the bus bar 21. A gap can be provided between the housing 13 and the bobbin 19, or the housing 13 and the bobbin 19 can be configured to be fitted into each other.

The bus bar 21 is disposed in a position close to the surface of the inner peripheral wall of the housing 13 in such a way that a bearing retaining section 29 to be described later can be positioned on the inner periphery. Of course, the bus bar 21 and the housing 13 are disposed lest the bus bar 21 and the housing 13 should get into touch with each other by the presence of air therebetween.

The rotor 15 is rotatably disposed on the side of the inner periphery of the stationary core 18. The rotor 15 includes a rotor axis 22, a rotation base 23, magnets 24, a magnet cover 25, and a side cover 26.

Figure 3:
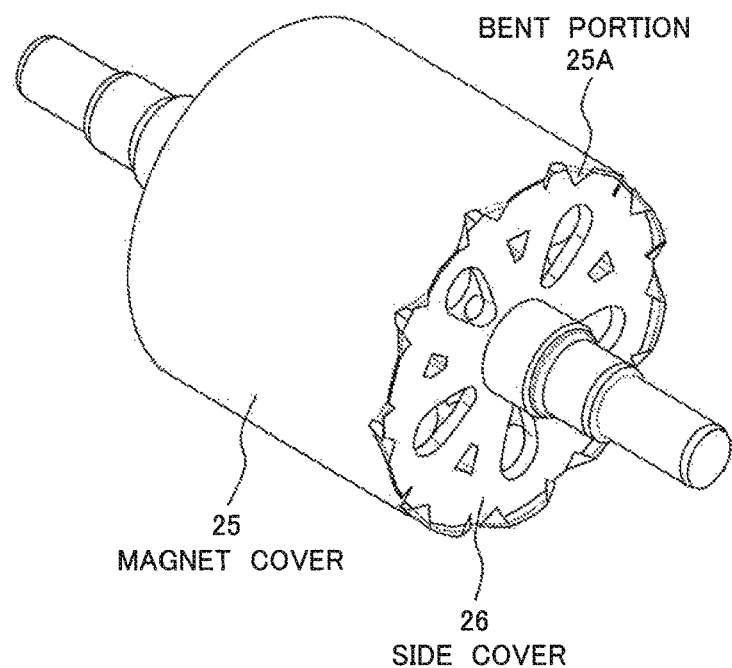
FIG. 3 is an external view according to the embodiment of the present invention after the cutout portions of the magnet cover are bent.

As shown in FIG. 3, the magnet 24 (not shown) is covered by the magnet cover 25, which prevents the magnet 24 from being scattered. Bent portion 25A are formed at the end surface of the magnet cover 25 as shown in FIG. 3 lest the magnet 24 should be scattered radially and axially.

The bent portions 25A are formed through corner portions 30 and corner positions 31 of the magnet cover, which form cutout portions, being bent at oblique angles to the direction of the rotor axis 22. In other words, the bent portions 25A are formed through each corner portion 30 and the corresponding corner portion 31, which face each other, being bent in opposite directions, respectively.

The above has an advantageous point in that a bent portion 25A can be easily formed at the corner portions 30 and 31, which face each other, by pressing a jig, the size of which fits the relevant cutout portion, to the cutout portion.

In addition, the end of a bus bar A 21 is connected to an input terminal 28 via a bus bar B 27 which penetrates the flange 14. The bus bar A 21 is wired so as to be connected to the respective phase coils, and U-phase power, V-phase power, and W-phase power, which are input through the input terminal 28, are input into the respective phase coils.

Since the basic structure of the rotating electrical machine 11 has been described above, more detailed description will be omitted.

Figure 4:
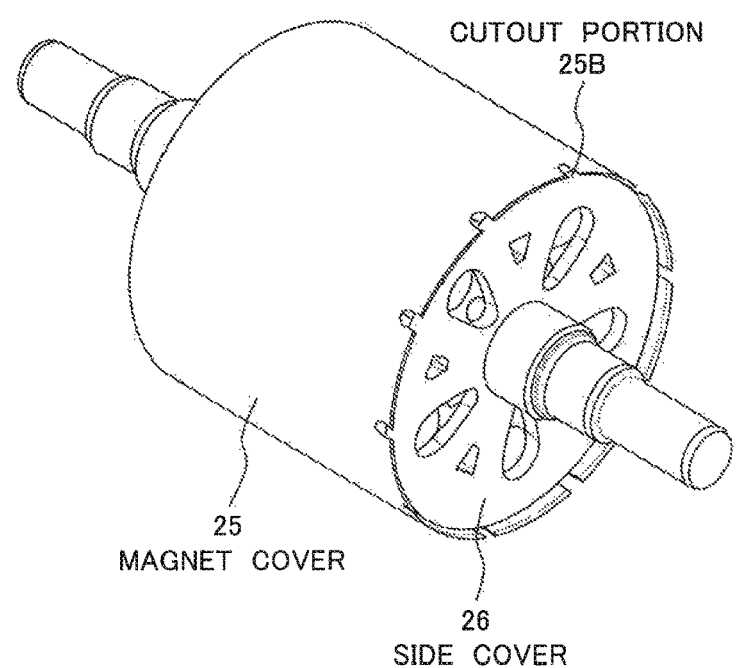
FIG. 4 is an external view according to the embodiment of the present invention after the magnet cover is press fitted.
Figure 5:
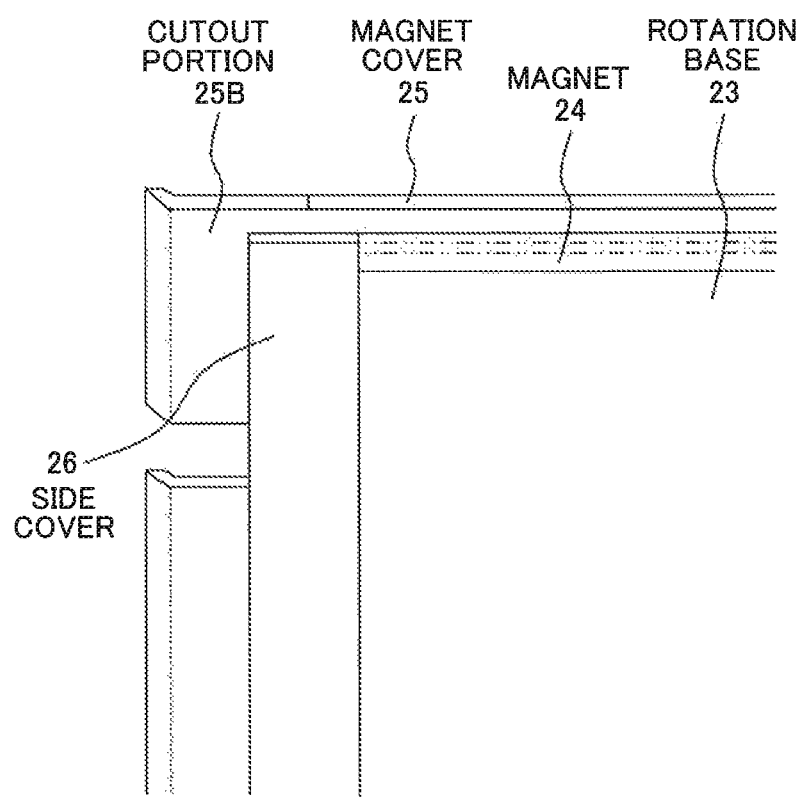
FIG. 5 is an enlarged view according to the embodiment of the present invention after the magnet cover is press fitted.

FIG. 4 is a diagram showing an external view after the magnet cover 25 is press fitted, and FIG. 5 is a diagram showing an enlarged view. By providing the cutout portions 25B, when the magnet cover 25 is press fitted, the magnet cover 25 having a cylindrical shape with cutout portions 25B provided can be easily deformed so as to be widened to the end toward the outer peripheral surface thereof. For example, by pressing the peripheral edge portion of the magnet cover, which is provided with the cutout portions 25B, against a plane, the peripheral edge portion can be readily deformed so as to be widened toward the end, so that peeps can be formed later. Therefore, without providing stepped shapes, it is possible for a similar peeping function to be obtained. As a result, it is possible that even if the clamping margin of the magnet cover 25 against the magnet 24 is increased, the press-fitting work can be easily executed. Therefore, by providing these cutout portions, it becomes possible to increase the binding force of the magnet cover 25 against the magnet 24 without impairing workability, so that the binding force of the magnet cover 25 enables the magnet 24 to be retained.

Incidentally, the cutout portions 25B can be made only by making incisions in the magnet cover. In other words, the width of the cutout portions 25B can be zero.

If it is possible to retain the magnet 24 only by a magnet cover 25, the conventional work of fixing the magnet 24 with an adhesive or the like becomes unnecessary, therefore the number of steps for assembling the rotating electrical machine can be reduced.

Figure 6:
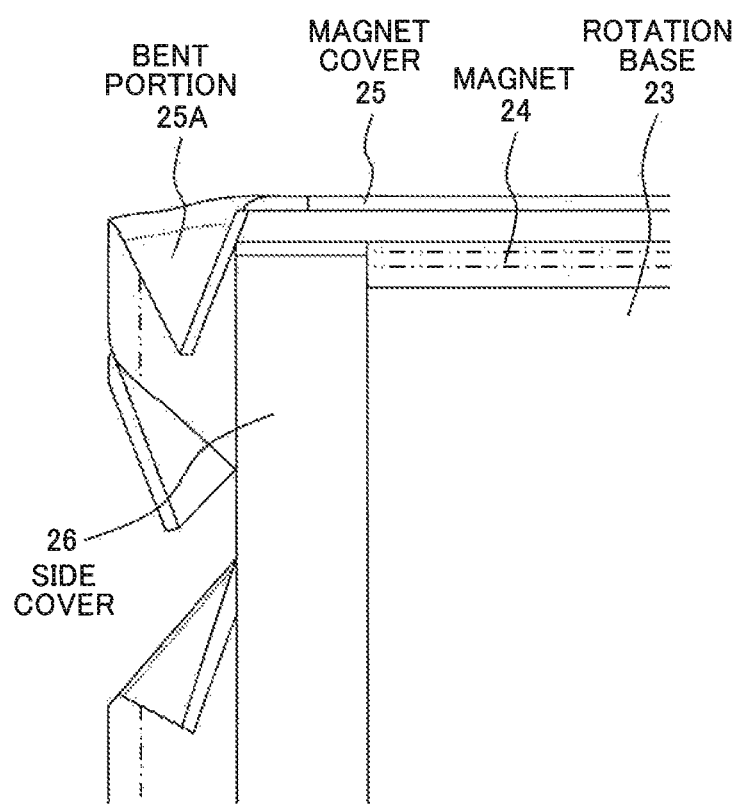
FIG. 6 is an enlarged view according to the embodiment of the present invention after the cutout portions of the magnet cover are bent.

FIG. 5 is an enlarged view before the cutout portions of the magnet cover 25 are bent, and FIG. 6 is an enlarged view after the cutout portions of the magnet cover 25 are bent. FIG. 8 to FIG. 11 are diagrams showing modifications 25C to 25F of the shape of a cutout portion of the magnet cover, respectively. By bending the corner portions of the cutout portion 25B toward the internal diameter, the wide cross-sectional areas of the bottoms of the bent portions can be secured, so that the breakage or cracks can be prevented from occurring in the rotating electrical machine. Furthermore, by executing only this bending process, the function of preventing the dropout of the magnet cover 25 can be provided, so that the work can be easily executed.

Figure 7:
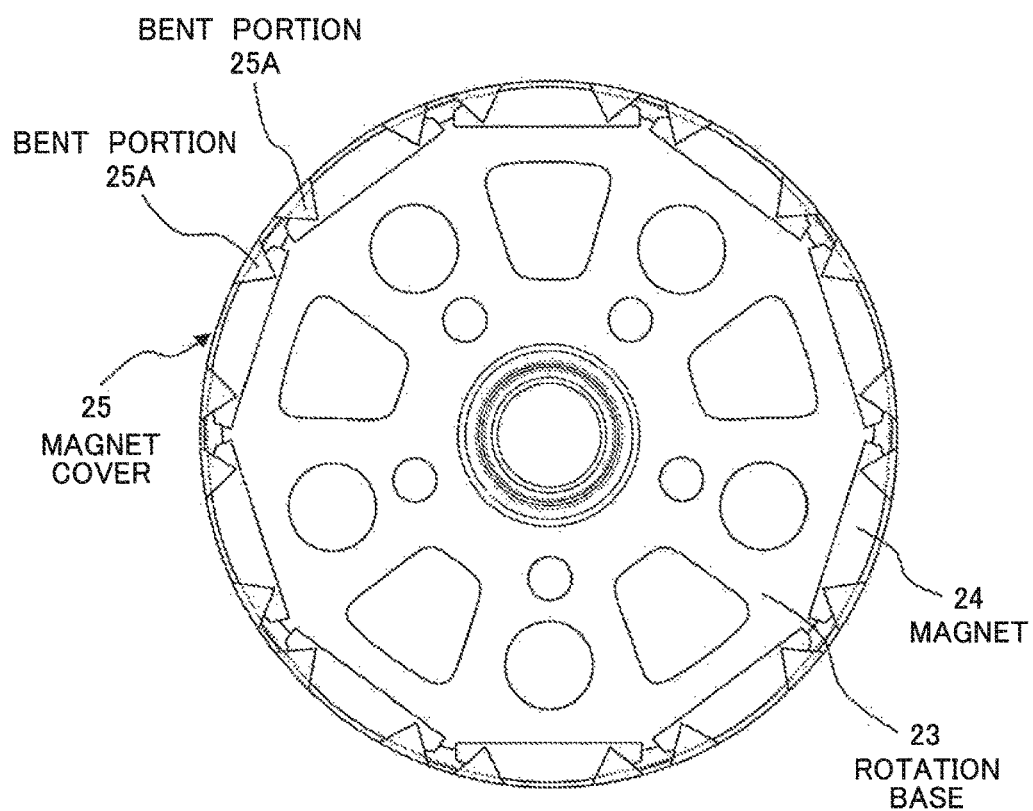
FIG. 7 is a diagram showing the positional relationship among the bent portions of the magnet cover and the magnets according to the embodiment of the present invention.
Figure 8:
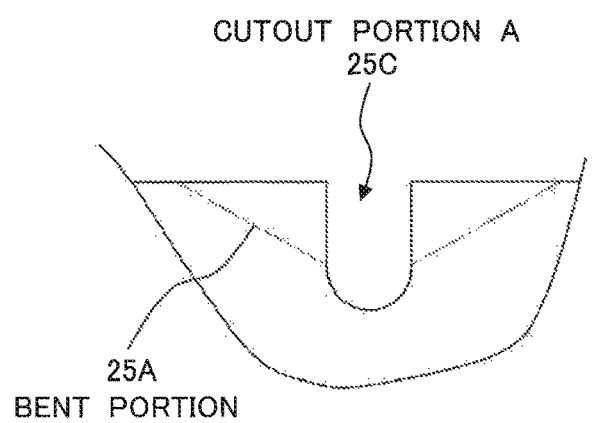
FIG. 8 is an external view of a modification of the shape of a cutout portion of the magnet cover according to the embodiment of the present invention.
Figure 9:
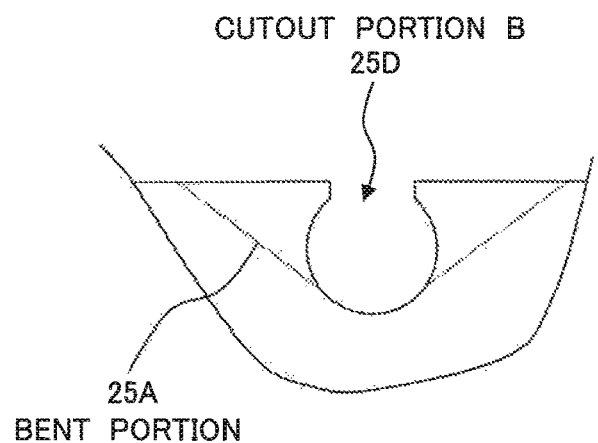
FIG. 9 is an external view of a modification of the shape of a cutout portion of the magnet cover according to the embodiment of the present invention.
Figure 10:
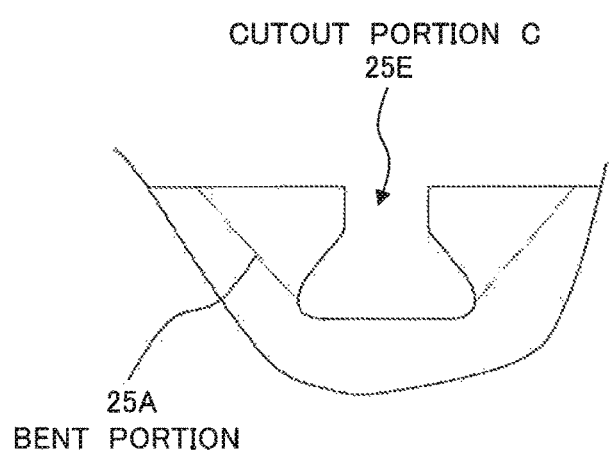
FIG. 10 is an external view of a modification of the shape of a cutout portion of the magnet cover according to the embodiment of the present invention.
Figure 11:
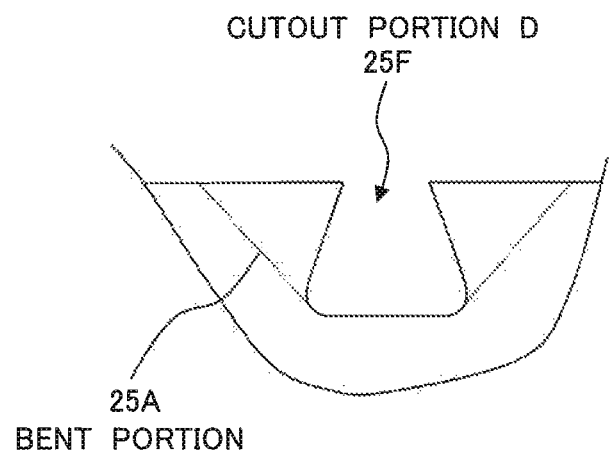
FIG. 11 is an external view of a modification of the shape of a cutout portion of the magnet cover according to the embodiment of the present invention.
Figure 12:
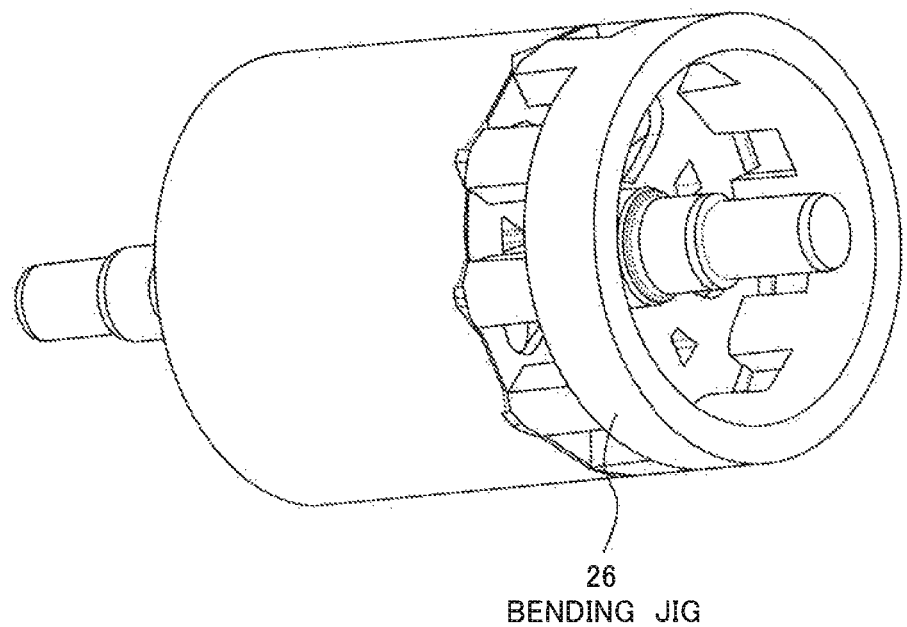
FIG. 12 is an external view of the magnet cover and a jig according to the embodiment of the present invention.

FIG. 7 is a diagram showing an example of the positional relationship among the bent portions 25A of the magnet cover 25 and the magnets 24. By providing cutout portions whose number is equal to the number of the magnet poles and by disposing one cutout portion between every pair of magnet poles, all the magnets are covered with the bent portions. BY covering the magnets with the bent portions, the magnets can be more firmly retained.

REFERENCE SINGS LIST

10 . . . Rotating Electrical Machine Assembly,
11 . . . Rotating Electrical Machine,
12 . . . Inverter Control Unit,
13 . . . Housing,
14 . . . Flange, 15 . . . Rotor,
16 . . . Stator,
17 . . . Opening,
18 . . . Stationary Core,
19 . . . Bobbin,
20 . . . Coil,
21 . . . Bus Bar A,
22 . . . Rotor Axis,
23 . . . Flotation Base,
24 . . . Magnet,
25 . . . Magnet Cover,
25A . . . Bent Portion,
25B . . . Cutout Portion,
26 . . . Side Cover,
27 . . . Bus Bar B,
28 . . . Input Terminal,
29 . . . Bearing Retaining Section,
30 . . . Corner Portion,
31 . . . Corner Portion,
32 . . . Jig.

The invention claimed is:

1. A rotating electrical machine comprising:
a cylindrical stator;
a rotor with a rotor axis disposed inside an inner periphery of the stator;
magnets provided on a periphery of the rotor; and
a magnet cover covering outer peripheral surfaces of the magnets; and
a side cover covering a radial end of the rotor;
wherein a cutout portion is provided on an opening edge of the magnet cover adjacent to the side cover, and corner portions of the cutout portion are bent toward an inner periphery of the magnet cover at an oblique angle to a direction of the rotor axis;
wherein the corner portions are bent at an oblique angle to an outer surface of the side cover.

2. The rotating electric machine according to claim 1, wherein there are a plurality of cutout portions, and the cutout portions are disposed at specific intervals.

3. The rotating electric machine according to claim 1, wherein a plurality of bent portions are provided, or bent portions are partly provided.

4. The rotating electric machine according to claim 3, wherein the bent portions are arranged to be simultaneously bendable by a bending jig.

5. The rotating electric machine according to claim 1, wherein the cutout portions whose number is equal to a number of magnet poles are provided, and one cutout portion is disposed between every pair of magnet poles.

6. The rotating electric machine according to claim 1, wherein portions of the magnet cover, along an outer periphery of the magnet cover, between bent portions are not bent.

* * * * *